(12) United States Patent
Song (10) Patent No.: US 10,422,364 B2
(45) Date of Patent: Sep. 24, 2019

(54) LATCH ASSEMBLY

(71) Applicant: THALES CETC AVIONICS CO., LTD., Chengdu, Sichuan (CN)

(72) Inventor: Zhenhua Song, Sichuan (CN)

(73) Assignee: THALES CETC AVIONICS CO., LTD., Chengdu, Sichuan (CN)

( * ) Notice: Subject to any disclaimer, the term of this patent is extended or adjusted under 35 U.S.C. 154(b) by 8 days.

(21) Appl. No.: 15/668,372

(22) Filed: Aug. 3, 2017

(65) Prior Publication Data
US 2018/0038398 A1 Feb. 8, 2018
US 2018/0216640 A9 Aug. 2, 2018

(30) Foreign Application Priority Data

Aug. 4, 2016 (CN) .......................... 2016 1 0633093

(51) Int. Cl.
*F16B 21/07* (2006.01)
*F16B 2/10* (2006.01)
*B64D 11/00* (2006.01)

(52) U.S. Cl.
CPC ............ *F16B 2/10* (2013.01); *B64D 11/0015* (2013.01); *B64D 11/00152* (2014.12); *F16B 21/073* (2013.01); *F16B 21/07* (2013.01)

(58) Field of Classification Search
CPC .. F16B 2/10; F16B 21/073; F16B 2/04; F16B 2/00; F16B 2/02; B64D 11/00152; B64D 11/0015
(Continued)

(56) References Cited

U.S. PATENT DOCUMENTS 4,619,428 A 10/1986 Bailey
4,889,304 A 12/1989 Glickman et al.
(Continued)

FOREIGN PATENT DOCUMENTS

CN 101604804 A 12/2009
CN 204137469 U 2/2015
(Continued)

OTHER PUBLICATIONS

Extended European Search Report for corresponding Application No. 17184379.0 dated Jan. 10, 2018.
(Continued)

*Primary Examiner* — Nkeisha Smith
(74) *Attorney, Agent, or Firm* — Yue (Robert) Xu; Apex Attorneys at Law, LLP (57) ABSTRACT

A latch assembly is provided according to the present application, which includes a latch body and a guiding plate. The latch body is provided with a latch end configured to connect a device, and the guiding plate is provided with multiple positioning holes, the latch body is provided with multiple convex embedding blocks matching with the multiple positioning holes respectively, the latch body is further provided with a clamper, and after the multiple embedding blocks of the latch body are inserted into the multiple positioning holes respectively, the clamper clamps the guiding plate to achieve the connection. The latch assembly has a simple and compact structure, occupies a small volume, can be assembled and disassembled conveniently with a high efficiency, saves operation time and operation efforts.

10 Claims, 7 Drawing Sheets

(58) Field of Classification Search
USPC ....... 248/200, 301, 303, 322, 304, 305, 308,
248/309.1, 309.2, 914; 292/128
See application file for complete search history.

(56) References Cited

U.S. PATENT DOCUMENTS

| | | | | |
|---|---|---|---|---|
| 4,953,495 | A * | 9/1990 | Salisbury | ................ B05B 5/082 |
| | | | | 118/70 |
| 5,941,399 | A | 8/1999 | Wang | |
| 6,957,555 | B1 * | 10/2005 | Nagel | ................... A47F 5/0861 |
| | | | | 211/57.1 |
| 9,951,904 | B2 * | 4/2018 | Perez | ................... F16M 13/022 |
| 2008/0311800 | A1 | 12/2008 | Wu | |
| 2009/0305545 | A1 | 12/2009 | Lin | |

FOREIGN PATENT DOCUMENTS

| | | |
|---|---|---|
| CN | 204835060 U | 12/2015 |
| DE | 2838962 A1 | 3/1980 |
| DE | 29616203 U1 | 12/1996 |
| FR | 2720792 A1 | 12/1995 |
| GB | 1373396 A | 11/1974 |

OTHER PUBLICATIONS

First Chinese Office Action regarding Application No. 201610633093.0 dated Sep. 27, 2017. English Translation provided by https://globaldossier.uspto.gov.

* cited by examiner

LATCH ASSEMBLY

CROSS-REFERENCE TO RELATED APPLICATION

The present application claims the priorities to Chinese patent application No. 201610633093.0 titled "LATCH ASSEMBLY", filed with the Chinese State Intellectual Property Office on Aug. 4, 2016, the entire disclosure of which is incorporated herein by reference.

FIELD

This application relates to the technical field of latch, and more particularly to a latch assembly.

BACKGROUND

Since being invented, airplanes have increasingly been an indispensable carrier in modern civilization and have drastically changed and influenced people's life. The time spending on the road has been greatly shortened. Lots of amusement devices (such as display screens, earphones) and security devices (such as oxygen masks) are provided in a passenger compartment of an airplane, and all these devices are generally hanged on an upper portion of the compartment. These devices all need to be examined and maintained periodically, and need to be replaced timely if necessary. Therefore, a latch structure, which is convenient to be assembled and disassembled, is generally employed to hang these devices into the compartment, so as to improve the assembly and disassembly efficiency. However, since the airplane may bump and shake in flying, the latch structure must have enough connection stability, so as to prevent the device from falling off due to the bumping and shaking and even causing safety accident. The latch structure used in a conventional airplane either, for improving the connection stability, has a complex structure and thus is difficult and time-consuming to be assembled and disassembled, or, for improving the assembly and disassembly efficiency, has a degraded connection stability and a degraded anti-shake performance, and is apt to cause a hazard condition that the device falls off and hurts people, which can hardly meet the requirements for flying of an airplane.

SUMMARY

The technical issue to be addressed and the technical task put forward by the present application is to improve the conventional technology, thus a latch assembly is provided, which addresses issues in the conventional technology that a conventional latch assembly can hardly meet the requirements for flying of an airplane and is be assembled and disassembled with a high difficulty and a low efficiency, and has a poor connection stability, and is apt to cause falling off of the device.

To address the above technical issues, the technical solutions of the present application are as follows.

A latch assembly, includes a latch body and a guiding plate. The latch body is provided with a latch end configured to connect a device, and the guiding plate is provided with multiple positioning holes, the latch body is provided with multiple convex embedding blocks matching with the multiple positioning holes respectively. The latch body is further provided with a clamper, and after the multiple embedding blocks of the latch body are inserted into the multiple positioning holes respectively, the clamper clamps the guiding plate to achieve the securing. The latch assembly according to the present application has a simple structure, and can be assembled and disassembled conveniently with a high efficiency. First the latch body has the multiple embedding blocks inserted into the multiple positioning holes, and thus the multiple positioning holes limit the moving range of the multiple embedding blocks in the plane where the multiple positioning holes are located, that is, the latch body is blocked from being separated in vertical, front or rear directions, and meanwhile, after the multiple embedding blocks are inserted into the multiple positioning holes respectively, the clamper clamps the guiding plate, thereby preventing the latch body from being escaped from the multiple positioning holes, and forming a stable securing structure of the latch body and the guiding plate, and improving the anti-shock performance of the securing, and effectively preventing the latch body from falling off, and preventing the device connected by the latch end from falling off and being damaged, and also preventing the device from hurting people, and improving the reliability and safety of the usage.

Further, an outer circumference of each of the multiple embedding blocks abuts against an inner wall of a corresponding positioning hole, preventing the latch body from shocking in vertical, front or rear direction, and further improving the stability of the securing, and preventing the device connected by the latch end from shaking, and adversely affecting the effect and the comfort of usage.

Further, the clamper includes a clamping plate, the clamping plate is connected to the latch body via a clamping mechanism, and the clamping mechanism controls the clamping plate to clamp or release the guiding plate. The clamping plate clamps the guiding plate, thereby preventing the multiple embedding blocks from escaping from the multiple positioning holes, ensuring a high connection stability, and improving the anti-shake performance, and preventing the latch body falling off caused by reasons such as shaking, and improving the reliability and safety of the usage.

Further, multiple clamping plates are provided, so as to provide multiple protections and strengthen the connection stability, thus, even if any one of the clamping plates breaks or loosens, the rest clamping plates may still stably clamp the guiding plate, preventing the latch body from falling off and improving the usage reliability.

Further, the clamping plate is provided with a first retaining slot with a width equivalent to the thickness of the guiding plate, and in the case that the clamping plate clamps the guiding plate, the guiding plate is stuck in the first retaining slot. The present application utilizes the first retaining slot to limit the moving range of the latch body in front and rear directions of the guiding plate, and the width of the first retaining slot is equivalent to the thickness of the guiding plate, thereby preventing the latch body from shaking in the front and rear directions, and improving the connection stability and the comfort of using the device connected to the latch body.

Further, the clamping plate is in an L shape on the whole. A second retaining slot is formed between a bent edge of the clamping plate and the latch body. The second retaining slot has a width equivalent to the thickness of the guiding plate, and in the case that the clamping plate clamps the guiding plate, the guiding plate is located in the second retaining slot. Similarly, the second retaining slot is utilized to limit the moving range of the latch body in the front and rear directions of the guiding plate, preventing the embedding blocks from escaping from the positioning holes and further maintaining a stable connection, and further, the width of the second retaining slot is equivalent to the thickness of the guiding plate, thereby preventing the latch body from shaking in the front and rear directions, and further improving the anti-shake performance.

Further, an edge, connected to the latch body, of each of the multiple embedding blocks is provided with a through slot, the clamping plate is arranged in the through slot, and the clamping plate clamps the guiding plate after passing through the multiple positioning holes. In this way, the structure of the latch body can be more compact, and the clamping plate utilizes the positioning holes matching with the embedding blocks to achieve the function of clamping the guiding plate.

Further, the clamping mechanism is an elastic clamping mechanism, which utilizes an elastic force to clamp automatically, preventing the multiple embedding blocks from escaping from the positioning hole and ensuring stale securing.

Further, the clamping mechanism includes an operating rod and a spring sleeved on the operating rod, and the operating rod is provided with a spring positioning structure. The operating rod passes through a through hole provided in the latch body and is then connected to the clamping plate. Pressing the operation rod enables the spring to be compressed and further to allow the clamping plate to release the clamping plate, and after releasing the operation rod, the spring restores to allow the clamping plates to clamp the guiding plate.

Further, the clamping mechanism includes a rotating shaft and a torsion spring, and the clamping plate is arranged on the rotating shaft by the torsion spring, and the rotating shaft is arranged on the latch body. Pressing the clamping plate may allow the clamping plate to be released, and after releasing the clamping plate, the clamping plate clamps the guiding plate under the action of the torsion spring to prevent the embedding block from escaping from the positioning hole.

Compared with the conventional technology, the advantages of the present application are as follows.

The latch assembly according to the present application has a simple and compact structure, occupies a small volume, can be assembled and disassembled conveniently with a high efficiency, saves operation time and operation efforts, and is convenient to be maintained and replaced, and also has a good connection reliability, a good anti-shake performance, can effectively prevent the situation of disconnection from occurring, protect safety of people, and also prevent the connected device from falling off and being damaged, also has a good connection stability and will not cause the shaking of the device, and eliminates noise due to shaking when the airplane shakes, and also ensures a high comfort of usage of the device.

DETAILED DESCRIPTION

The technical solution according to the embodiments of the present application will be described clearly and completely as follows in conjunction with the drawings of the embodiments of the present application. It is apparent that the described embodiments are only a few of the embodiments rather than all of the embodiments of the present application. Any other embodiments obtained by those skilled in the art based on the embodiments in the present application without any creative work fall in the scope of protection of the present application.

A latch assembly disclosed by embodiments of the present application has a simple structure, a high assembling precision, can be assembled and disassembled conveniently with a high efficiency, and is convenient to maintain and replace, meanwhile, ensures good connecting stability, good anti-shake performance, and avoids shaking and falling off of a device connected thereto, and ensures safety using for the device.

As shown in FIGS. 1 to 11, a latch assembly includes a latch body 1 and a guiding plate 2. The latch body 1 is provided with a latch end 3 configured to connect a device, and the guiding plate 2 is provided with multiple positioning holes 4. The latch body 1 is provided with convex embedding blocks 5 matching with the positioning holes 4 respectively, and the latch body 1 is further provided with a clamper. After the embedding blocks 5 of the latch body 1 are inserted into the positioning holes 4 respectively, the clamper clamps the guiding plate 2 to achieve securing.

For improving the securing stability and avoiding shaking, an outer circumferential dimension of an embedding block 5 is set to match with a hole dimension of a positioning hole 4, and an outer circumference 51 of the embedding block 5 abuts against an inner wall 41 of the positioning hole 4, so as to prevent the latch body 1 from shaking in vertical, front or rear directions in a plane where the positioning hole 4 is located. The embedding block 5 may be configured in various structural forms, for example, a triangular shape, a crossing type etc. As long as the outer circumference 51 of the embedding block 5 is supported onto the positioning hole 4 at multiple points, a good position limiting may just be achieved, shaking may be avoided, and the usage comfort of a hanged device may be improved. For example, if the hanged device is a display screen, the image can be seen clearly since the display screen has no shaking.

Figure 10:
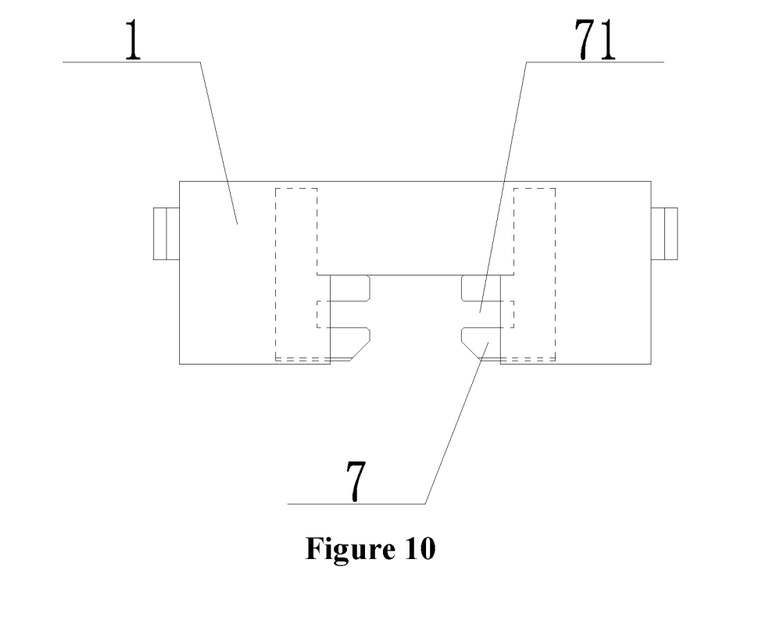
FIG. 10 is a schematic view showing the structure of a first embodiment of a clamping plate.
Figure 11:
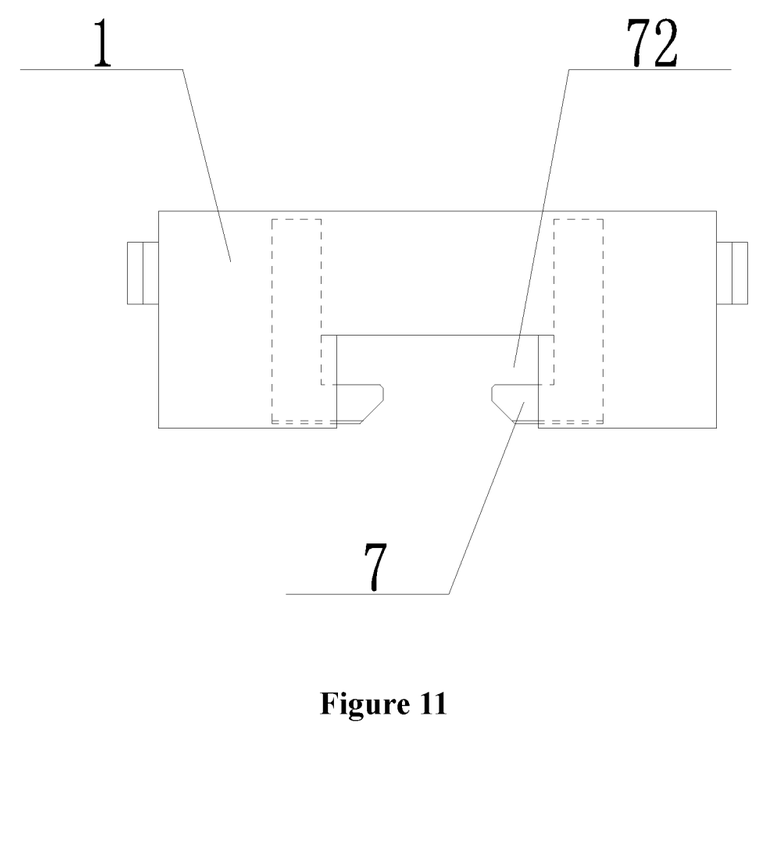
FIG. 11 is a schematic view showing the structure of a second embodiment of the clamping plate.

The clamper includes a clamping plate 7, and the clamping plate 7 is secured to the latch body 1 by a clamping mechanism 8. The clamping mechanism 8 enables the clamping plate 7 to clamp or release the guiding plate 2. As shown in FIG. 10, the clamping plate 7 is provided with a first retaining slot 71 having a width equivalent to the thickness of the guiding plate 2, and when the clamping plate 7 clamps the guiding plate 2, the guiding plate 2 is stuck into the first retaining slot 71. Further as shown in FIG. 11, the clamping plate 7 is in an L shape on the whole, and a second retaining slot 72 is formed between a folded edge of the clamping plate 7 and the latch body 1. The second retaining slot 72 has a width equivalent to the thickness of the guiding plate 2, and when the clamping plate 7 clamps the guiding plate 2, the guiding plate 2 is located in the second retaining slot 72. The first retaining slot 71 or the second retaining slot 72 is utilized to restrict the movement of the latch body in a front direction and a rear direction of the guiding plate, and the width of each of the first retaining slot 71 and the second retaining slot 72 is equivalent to the thickness of the guiding plate, thus, a gap of the securing is eliminated, thereby avoiding the latch body from shaking in the front and rear directions, and further improving the securing stability, and preventing the hanged device on the latch body from shaking and adversely affecting comfort of the usage.

Figure 8:
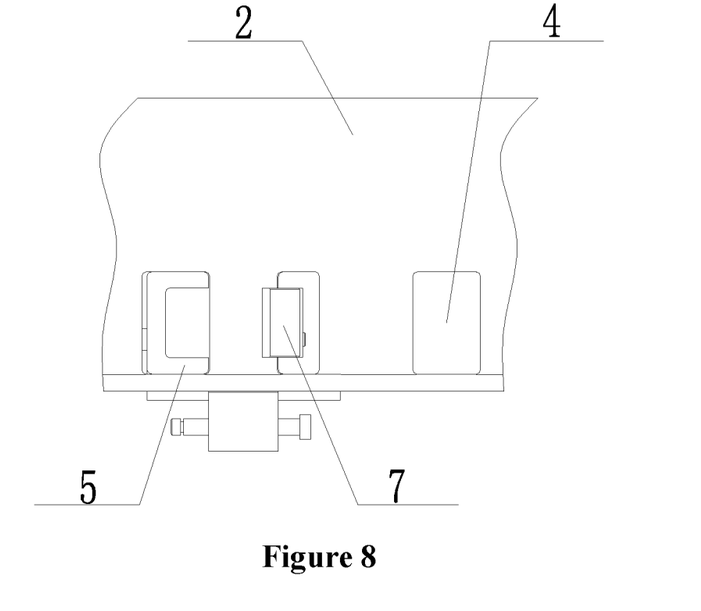
FIG. 8 is a schematic view showing he structure of a third embodiment of the present application.
Figure 9:
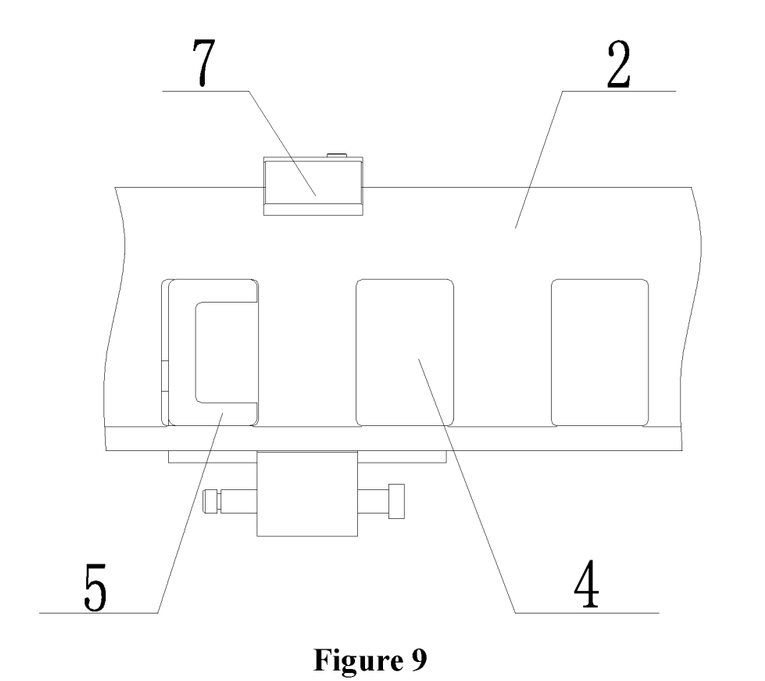
FIG. 9 is a schematic view showing the structure of a fourth embodiment of the present application.

Further, as shown in FIGS. 2 to 9, the latch body 1 may be provided with one or multiple clamping plates 7. In the case that multiple clamping plates 7 are employed for securing, multiple protections can be provided. If one of the clamping plates is broken or loosened, the rest clamping plates can still stably clamp the guiding plate, preventing the embedding block 5 from escaping from the positioning hole, avoiding the falling off of the device, and improving safety of the usage. For preventing the embedding block from escaping from the positioning hole, a structure with multiple clamping plates sticking the guiding plate can be employed, as shown in FIG. 8, a special securing hole for the clamping plate 7 to pass through is provided in the guiding plate 2, or as shown in FIG. 9, the clamping plate 7 directly clamps an edge of the guiding plate 2. However, the above structures all make the structure of the latch body not compact, and take up a large volume. The structures shown in FIGS. 2 and 7 may be more compact, take up a less volume, and the operation thereof may be more convenient.

Figure 1:
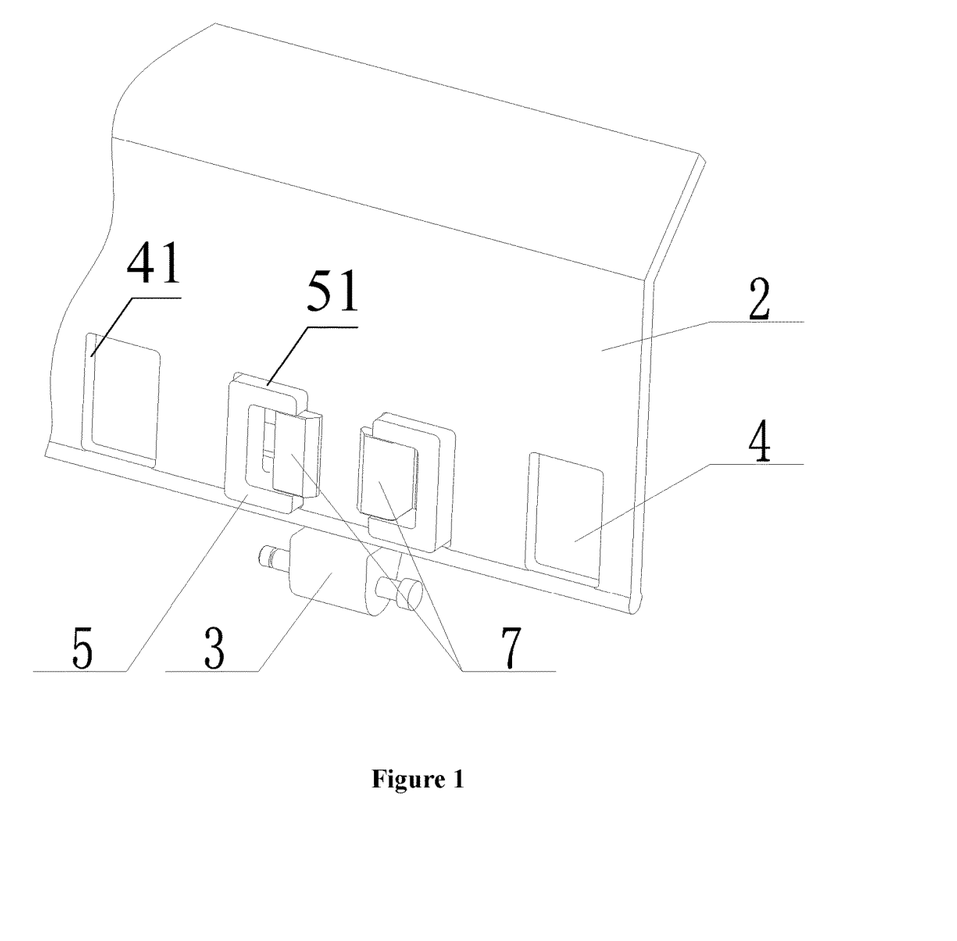
FIG. 1 is a schematic view showing the structure of a first embodiment of the present application.
Figure 2:
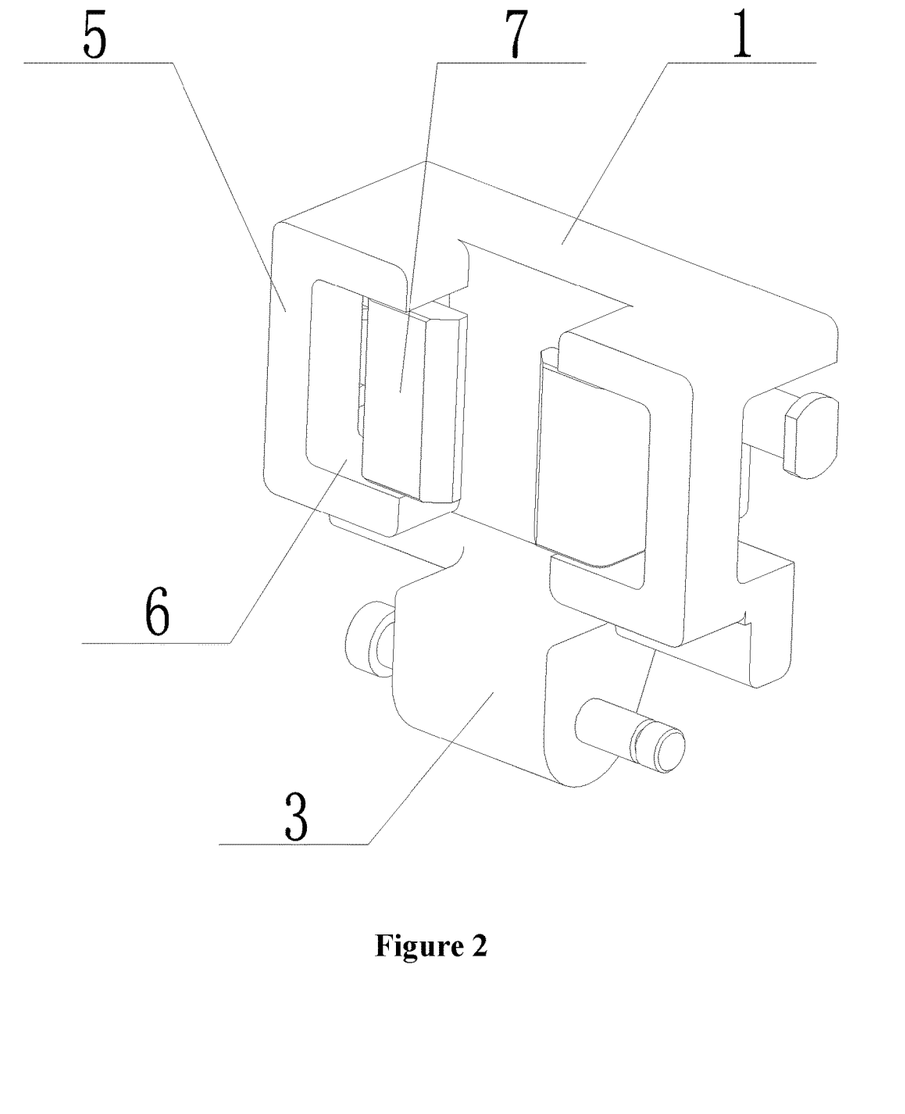
FIG. 2 is a schematic view showing the structure of a latch body according to the first embodiment of the present application.
Figure 3:
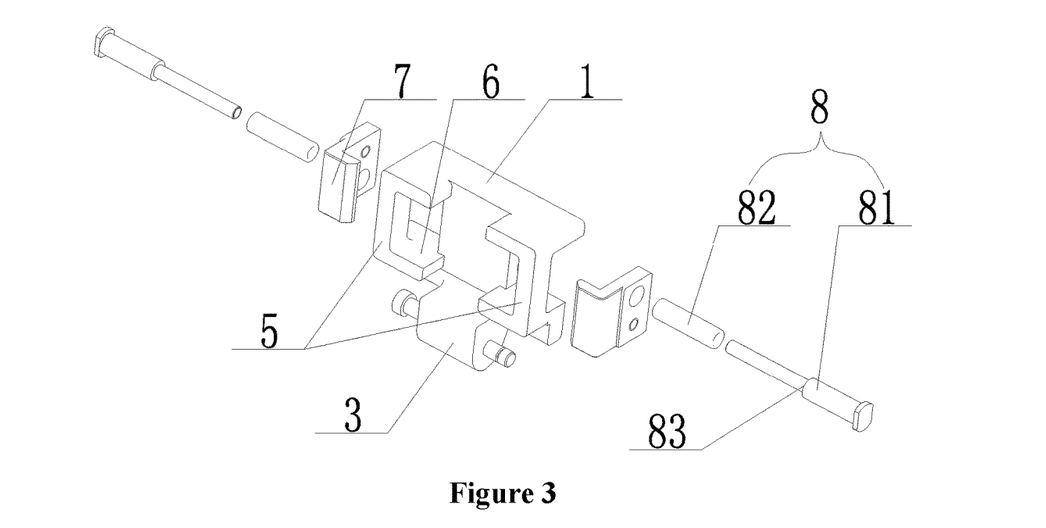
FIG. 3 is a schematic view showing an exploded structure of the latch body according to the first embodiment of the present application.
Figure 4:
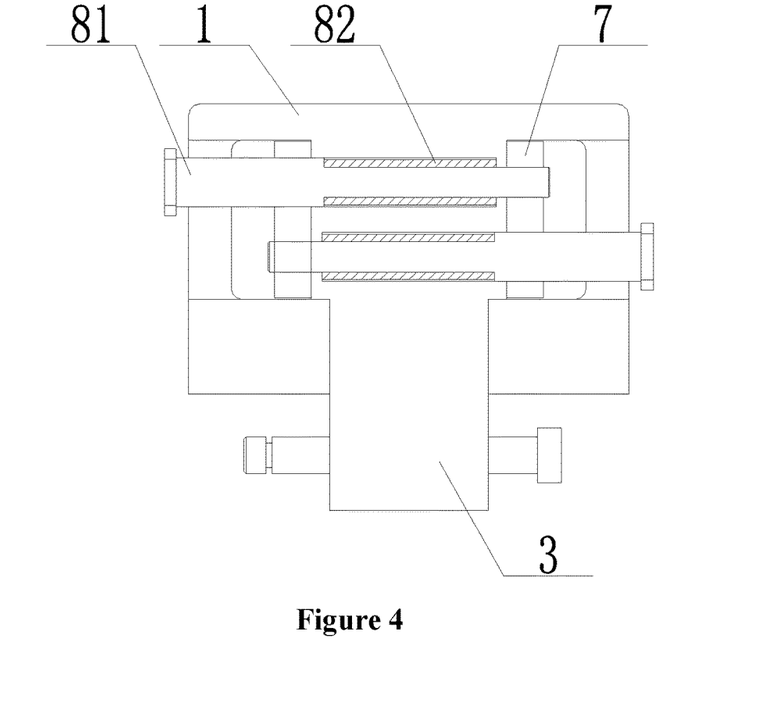
FIG. 4 is a schematic view showing a sectional structure of a first embodiment of a clamping mechanism according to the present application.
Figure 5:
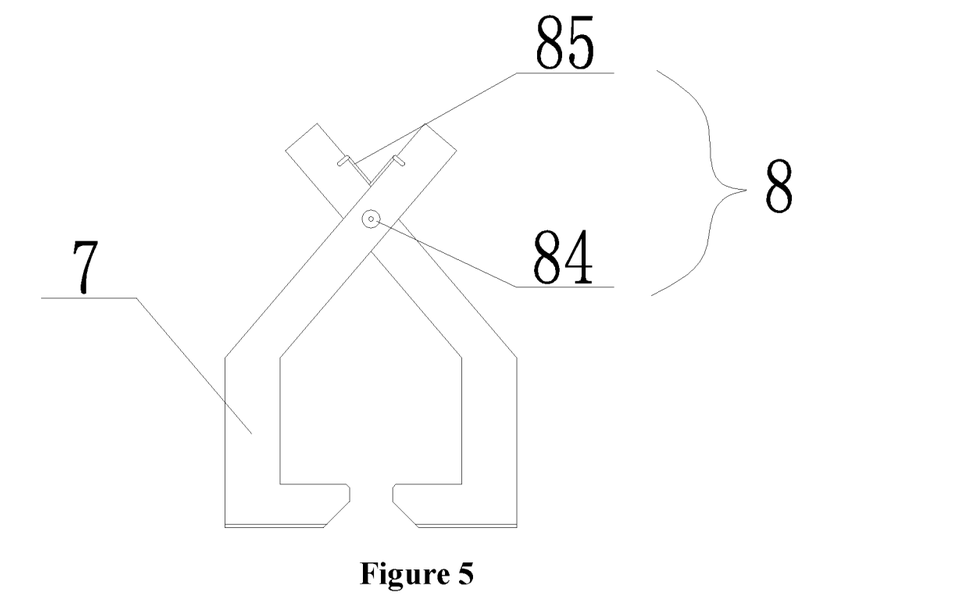
FIG. 5 is a schematic view showing the structure of a second embodiment of the clamping mechanism.
Figure 6:
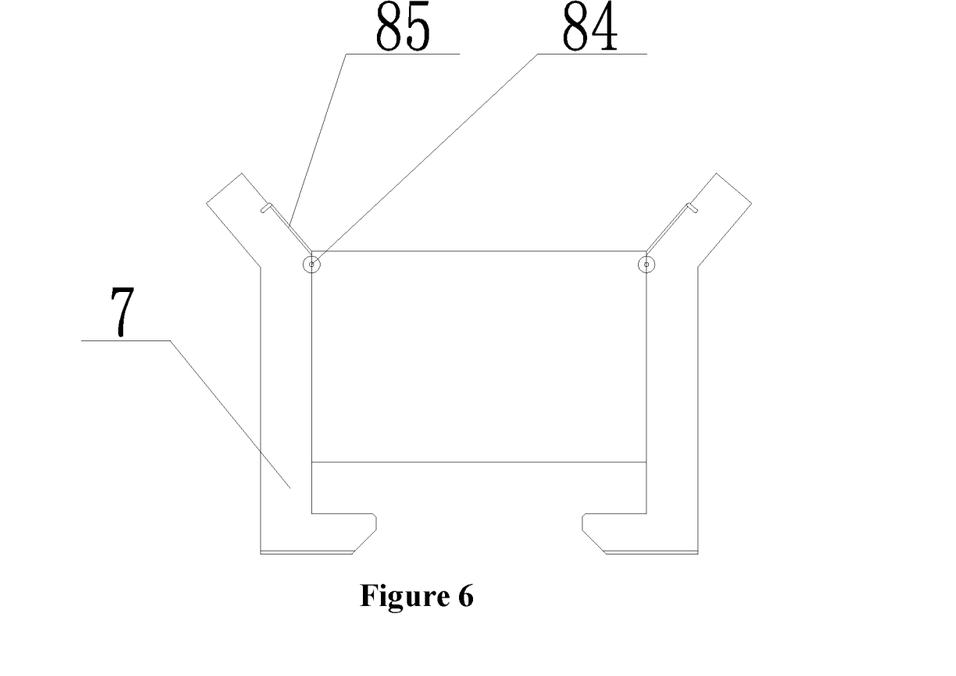
FIG. 6 is a schematic view showing the structure of a third embodiment of the clamping mechanism.
Figure 7:
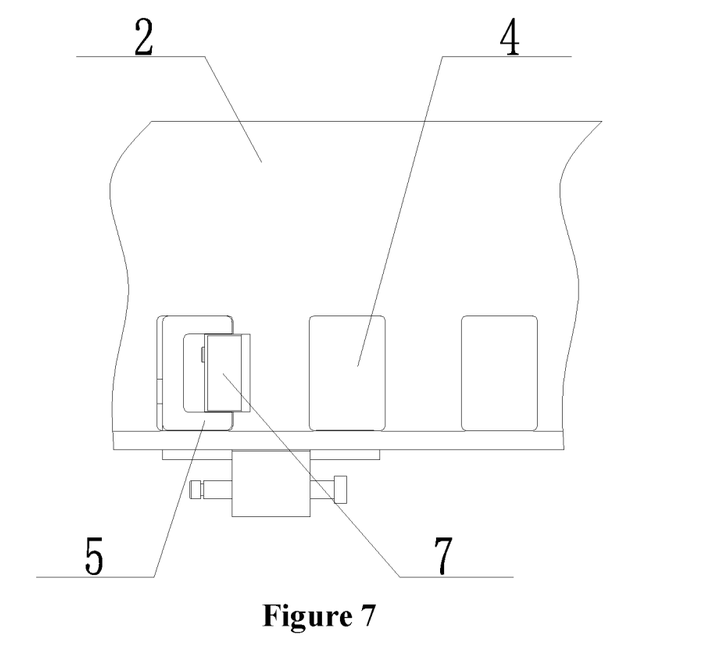
FIG. 7 is a schematic view showing the structure of a second embodiment of the present application.

The clamping mechanism 8 may be embodied as various structures, for example, a screw rod clamping mechanism. The clamping plate 7 is connected to the screw rod, and by screwing the screw rod, the guiding plate is clamped by the clamping plate 7 tightly. In this embodiment, for improving the convenience of the operation, the clamping mechanism 8 is embodied as an elastic clamping mechanism which employs an elastic component, such as an elastic sheet, a spring and a torsion spring, for performing automatic clamping, and the assembly and disassembly are more convenient and efficient. As shown in FIGS. 2 to 4, the clamping mechanism 8 includes an operating rod 81 and a spring 82 sleeved on the operating rod 81. The operating rod 81 is provided with a spring positioning structure 83, and the operating rod 81 passes through a through hole provided in the latch body 1 and then is connected to the clamping plate 7 by screw threads or a pin. A step configured to position the spring 82 is provided in the through hole of the latch body 1. As shown in FIGS. 5, 6, the clamping mechanism 8 includes a rotating shaft 84 and a torsion spring 85, and the clamping plate 7 is arranged on the rotating shaft 84 by the torsion spring 85, and the rotating shaft 84 is arranged onto the latch body 1. FIG. 5 shows that two clamping plates 7 are arranged on the same rotating shaft 84, and FIG. 6 shows that the clamping plates 7 are respectively arranged on different rotating shafts 84.

As shown in FIGS. 2 to 4, two embedding blocks 5 are spaced apart on the latch body 1, and a through slot 6 is provided in an edge, connected to the latch body 1, of each of the embedding blocks 5. The through slot 6 is located at a side of one embedding block 5 facing towards the other embedding block 5. Two clamping plates 7 are arranged in two through slots 6 respectively, and the two clamping plates 7 at two sides are arranged symmetrically. Each of the two clamping plates 7 is in an L shape on the whole, and a bent edge of the clamping plate 7 is located at a side where a corresponding embedding block 5 protrudes. A gap is presented between the bending edge of the clamping plate 7 and the latch maim body 1, and the gap is the second retaining slot 72. A tail portion of the clamping plate 7 is connected to the latch body 1 by the clamping mechanism 8, and the clamping mechanism 8 according to this embodiment is embodied as a structure including two operating rods 81 and two springs 82, and the two operation rods 81 and the two springs 82 are in parallel with the plane where two positioning holes 4 are located. The two operating rods 81 drive the clamping plate 7 to slide on the plane where the two positioning holes 4 is located. Pressing the two operating rods 81 may allow the clamping plate 7 to be retracted into an internal region of the embedding block 5 along a corresponding through slot 6. After releasing the two operating rods 81, the two clamping plates 7 protrude out of the two embedding blocks 5 along the two through slots 6, and the two operating rods 81 and the two springs 82 are respectively connected to the clamping plates 7 at two sides.

In using the latch assembly according to the above embodiment, the two operating rods 81 are pressed first to allow the two clamping plates 7 to move and open towards the two sides, and each of the two clamping plates 7 is moved into the internal region of the corresponding embedding block 5 along the corresponding through slot 6, and then the embedding block 5 is inserted into a corresponding positioning hole 4 and the clamping plate 7 smoothly passes through the positioning hole 4 along with the embedding block 5, and then the two operating rods 81 are released, and the two clamping plates 7 at the two sides, after closing up to the center, clamp the region, between the two positioning holes 4, of the guiding plate 2, and the guiding plate 2 is stuck inside two second retaining slot 72. The clamping plate 7 effectively prevents the embedding block 5 from escaping from the two positioning holes 4, maintains a stable connection, and thus prevents the whole latch body 1 from falling off. When it is required to be detached, just the two operating rods 81 are pressed to allow the two clamping plates 7 to move towards the two sides, and the guiding plate 2 is released from the two second retaining slot 72, the two clamping plate 7 are moved to the internal regions of the two embedding blocks 5, and then the two embedding blocks 5 may be smoothly drawn from the two positioning holes. The operation is convenient, saves time and effort, and improves the working efficiency.

The above embodiments are only preferred embodiments of the present application. It should be noted that, the preferred embodiments described above should not be considered as the limiting the present application. The scope of the present application is defined by the claims. For those skilled in the art, a few of improvements and modifications may also be made without departing from the spirit and scope of the present application. These improvements and modifications should also be deemed to fall within the scope of protection of the present application.

What is claimed is:
1. A latch assembly, comprising:
a latch body, and
a guiding plate, wherein the latch body is provided with a latch end configured to connect a device, and the guiding plate is provided with a plurality of positioning holes, the latch body is provided with a plurality of convex embedding blocks matching with the plurality of positioning holes respectively, wherein the latch body is further provided with a clamper, and after the plurality of convex embedding blocks of the latch body are inserted into the plurality of positioning holes respectively, the clamper clamps the guiding plate, wherein an outer circumference of each of the plurality of convex embedding blocks abuts against an inner wall of a corresponding positioning hole.

2. The latch assembly according to claim 1, wherein the clamper comprises a clamping plate, the clamping plate is connected to the latch body via a clamping mechanism, and the clamping mechanism controls the clamping plate to clamp or release the guiding plate.

3. The latch assembly according to claim 2, wherein a number of the clamping plate is more than one.

4. The latch assembly according to claim 2, wherein the clamping plate is provided with a first retaining slot with a width equivalent to a thickness of the guiding plate, and in a case that the clamping plate clamps the guiding plate, the guiding plate is stuck in the first retaining slot.

5. The latch assembly according to claim 4, wherein an edge, connected to the latch body, of each of the plurality of convex embedding blocks is provided with a through slot, the clamping plate is arranged in the through slot, and the clamping plate clamps the guiding plate after passing through the positioning hole.

6. The latch assembly according to claim 2, wherein the clamping plate is in an L shape, and a second retaining slot is formed between a bent edge of the clamping plate and the latch body, the second retaining slot has a width equivalent to a thickness of the guiding plate, and in a case that the clamping plate clamps the guiding plate, the guiding plate is located in the second retaining slot.

7. The latch assembly according to claim 6, wherein an edge, connected to the latch body, of each of the plurality of convex embedding blocks is provided with a through slot, the clamping plate is arranged in the through slot, and the clamping plate clamps the guiding plate after passing through the positioning hole.

8. The latch assembly according to claim 2, wherein the clamping mechanism is an elastic clamping mechanism.

9. The latch assembly according to claim 8, wherein the clamping mechanism comprises an operating rod and a spring sleeved on the operating rod, the operating rod is provided with a spring positioning structure, and the operating rod passes through a through hole provided in the latch body and is then connected to the clamping plate.

10. The latch assembly according to claim 8, wherein the clamping mechanism comprises a rotating shaft and a torsion spring, the clamping plate is arranged on the rotating shaft by the torsion spring, and the rotating shaft is arranged on the latch body.

* * * * *